(12) United States Patent
Kim et al.

(10) Patent No.: US 8,554,367 B2
(45) Date of Patent: Oct. 8, 2013

(54) ROBOT

(75) Inventors: Hong Won Kim, Seoul (KR); Woo Sup Han, Yongin-si (KR); Yong Jae Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 692 days.

(21) Appl. No.: 12/656,193

(22) Filed: Jan. 20, 2010

(65) Prior Publication Data

US 2010/0191373 A1 Jul. 29, 2010

(30) Foreign Application Priority Data

Jan. 23, 2009 (KR) .................. 10-2009-0005782

(51) Int. Cl.
 A63H 13/02 (2006.01)
 A63H 29/22 (2006.01)
(52) U.S. Cl.
 USPC ..................... 700/245; 700/264; 446/353
(58) Field of Classification Search
 USPC ............ 700/245, 250, 264; 446/280, 337, 446/353–356
 See application file for complete search history.

(56) References Cited

U.S. PATENT DOCUMENTS

| | | | | |
|---|---|---|---|---|
| 4,662,856 A | * | 5/1987 | Getgey et al. | 446/280 |
| 5,802,488 A | * | 9/1998 | Edatsune | 704/231 |
| 6,149,490 A | * | 11/2000 | Hampton et al. | 446/353 |
| 6,895,305 B2 | * | 5/2005 | Lathan et al. | 700/245 |
| 7,458,874 B2 | * | 12/2008 | Rung et al. | 446/330 |
| 7,689,319 B2 | * | 3/2010 | Kanda et al. | 700/245 |
| 2009/0173561 A1 | * | 7/2009 | Moriguchi et al. | 180/167 |

FOREIGN PATENT DOCUMENTS

| | | | |
|---|---|---|---|
| CN | 201008742 Y | * | 1/2008 |
| EP | 36797 A1 | * | 9/1981 |
| GB | 2221401 A | * | 2/1990 |
| JP | 43-26069 B | * | 11/1968 |
| JP | 02065887 A | * | 3/1990 |
| JP | 02243185 A | * | 9/1990 |
| JP | 2000202171 A | * | 7/2000 |
| JP | 2001208869 A | * | 8/2001 |
| JP | 2003126564 A | * | 5/2003 |
| JP | 2004041329 A | * | 2/2004 |

OTHER PUBLICATIONS

EPO machine translation of EP 36797 A1.*
Derwent English abstract for CN 201008742 Y.*
Translation of JP 43-26069 B.*
Translation of JP 2-243185 A.*
Translation of JP 43-26069 B (original JP document published Nov. 9, 1968).*

(Continued)

*Primary Examiner* — James P Trammell
*Assistant Examiner* — David Testardi
(74) *Attorney, Agent, or Firm* — Staas & Halsey LLP

(57) ABSTRACT

Disclosed herein is a robot, which has a simple structure and makes a gesture in a curved shape. The robot includes a body part, at least one cam member symmetrically arranged at both sides of the inside of the body part, an outer cover member surrounding the at least one cam member, and a linear moving device to linearly move the at least one cam member. The shape of the outer cover member is varied, under the condition that the outer cover member is adhered closely to the at least one cam member, according to the movement of the at least one cam member.

18 Claims, 8 Drawing Sheets

(56) References Cited

OTHER PUBLICATIONS

Translation of JP 2-243185 A (original JP document published Sep. 27, 1990).*

EPO machine translation of EP 36797 A1 (original EP document published Sep. 30, 1981).*

Derwent English abstract for CN 201008742 Y (original CN document published Jan. 23, 2008).*

* cited by examiner

ROBOT

CROSS-REFERENCE TO RELATED APPLICATIONS

This application claims the benefit of Korean Patent Application No. 2009-0005782, filed on Jan. 23, 2009, in the Korean Intellectual Property Office, the disclosure of which is incorporated herein by reference.

BACKGROUND

1. Field

Embodiments relate to a robot, which makes a gesture.

2. Description of the Related Art

Due to advances in robotic engineering, robots are increasingly communicating with humans. Various techniques for nonverbal communication between robots and humans have been developed.

One example of such nonverbal communication is a gesture. The gesture means the motion of a body or a hand, which is used to provide added effect to a conversation. In this way, a robot expresses feelings and state of mind.

However, a general robot has a structure including various links and joints, and thus has limited ability to gesture. That is, since the robot uses links and joints, the number of parts of the robot is increased and the structure of the robot is complicated. Thereby, the production cost of the robot is increased. Further, if the robot makes a gesture through the links and the joints, the gesture does not appear natural and smooth. Motions of the robot are not smoothly connected, thus detracting from the aesthetics of the robot.

Therefore, a robot, which flexibly makes a gesture with a simple structure has been required. Emotions expressed by such a robot may be smooth and provide a favorable impression to humans.

SUMMARY

Therefore, it is an aspect to provide a robot, which has a simple structure and makes a gesture with a curved shape.

Additional aspects will be set forth in part in the description which follows and, in part, will be apparent from the description, or may be learned by practice of the invention.

The foregoing and/or other aspects of the present invention are achieved by providing a robot including at least one cam member, and an outer cover member surrounding the at least one cam member, wherein the shape of the outer cover member is varied, when the outer cover member is adhered closely to the at least one cam member, according to the movement of the at least one cam member.

The robot may further include a display device to display data. The at least one cam member may move corresponding to the movement of an image displayed on the display device. The at least one cam member may have a triangular shape with rounded corners. The robot may further include a body part to receive the at least one cam member, and the at least one cam member may be symmetrically arranged at both sides of the inside of the body part.

Three cam members may be arranged in the vertical direction at each of both sides of the inside of the body part. The outer cover member may be made of a flexible and elastic material. The shape of the outer cover member may be varied into a curved shape. The robot may further include a cam rotary shaft to move the at least one cam member, and the at least one cam member may be rotated on the cam rotary shaft.

The robot may further include a linear moving device to linearly move the at least one cam member.

The linear moving device may include a rack gear to move the at least one cam member in the vertical direction, a pinion gear engaged with the rack gear and moving in the vertical direction, a pinion motor to drive the pinion gear, a cam motor to rotate the at least one cam member, and a bracket to support the pinion motor and the cam motor such that the pinion gear and the at least one cam member move together.

The foregoing and/or other aspects are also achieved by providing a robot including at least one cam member, and an outer cover member surrounding the at least one cam member, wherein a shape of the outer cover member is varied according to the movement of the at least one cam member, to thereby make a gesture.

The gesture may represent human arm motions. The arm motions may include a motion of raising both arms, a motion of lowering both arms, and a motion of extending both arms in parallel. The robot may further include a display device to display data. The robot may make the gesture corresponding to the movement of an image displayed on the display device.

The foregoing and/or other aspects are achieved by providing a robot including a body part, a plurality of cam members symmetrically arranged at both sides of an inside of the body part, an outer cover member adhered to the at least one cam member, and a linear moving device to linearly move the at least one cam member, wherein a shape of the outer cover member is varied, according to the movement of the at least one cam member.

The robot may further include a display device to display data, and the at least one cam member may move corresponding to the movement of an image displayed on the display device.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
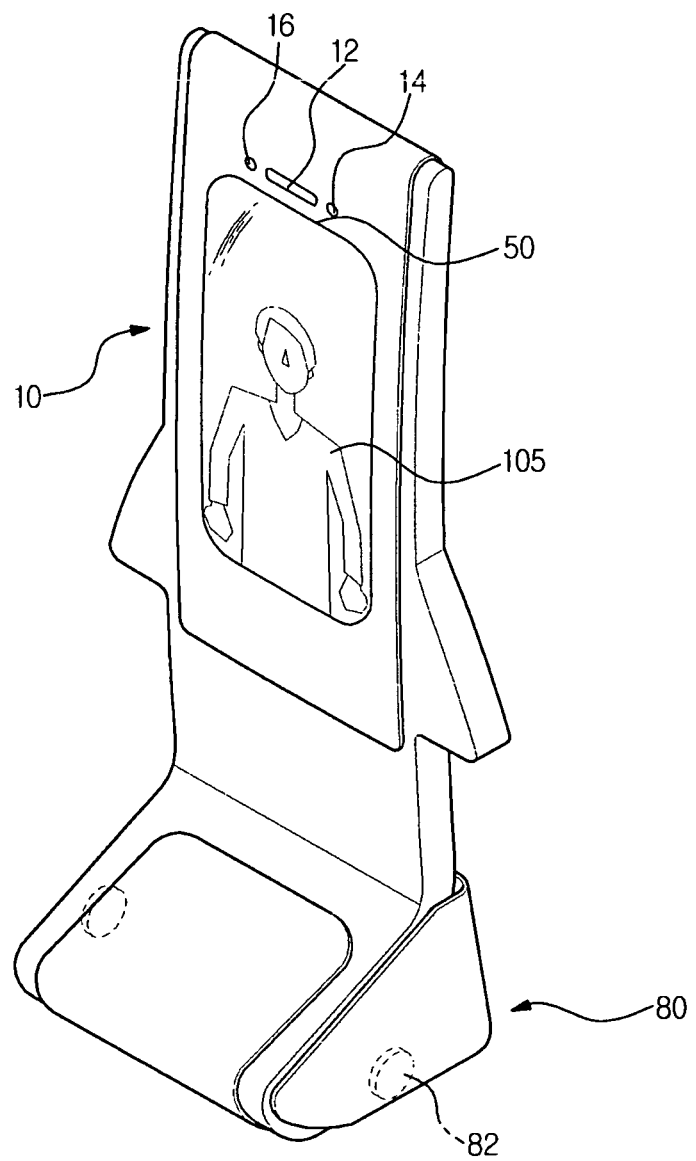
FIG. 1 is a perspective view illustrating the external appearance of a robot in accordance with one exemplary embodiment.

Reference will now be made in detail to the embodiments, examples of which are illustrated in the accompanying drawings, wherein like reference numerals refer to the like elements throughout.

Figure 2:
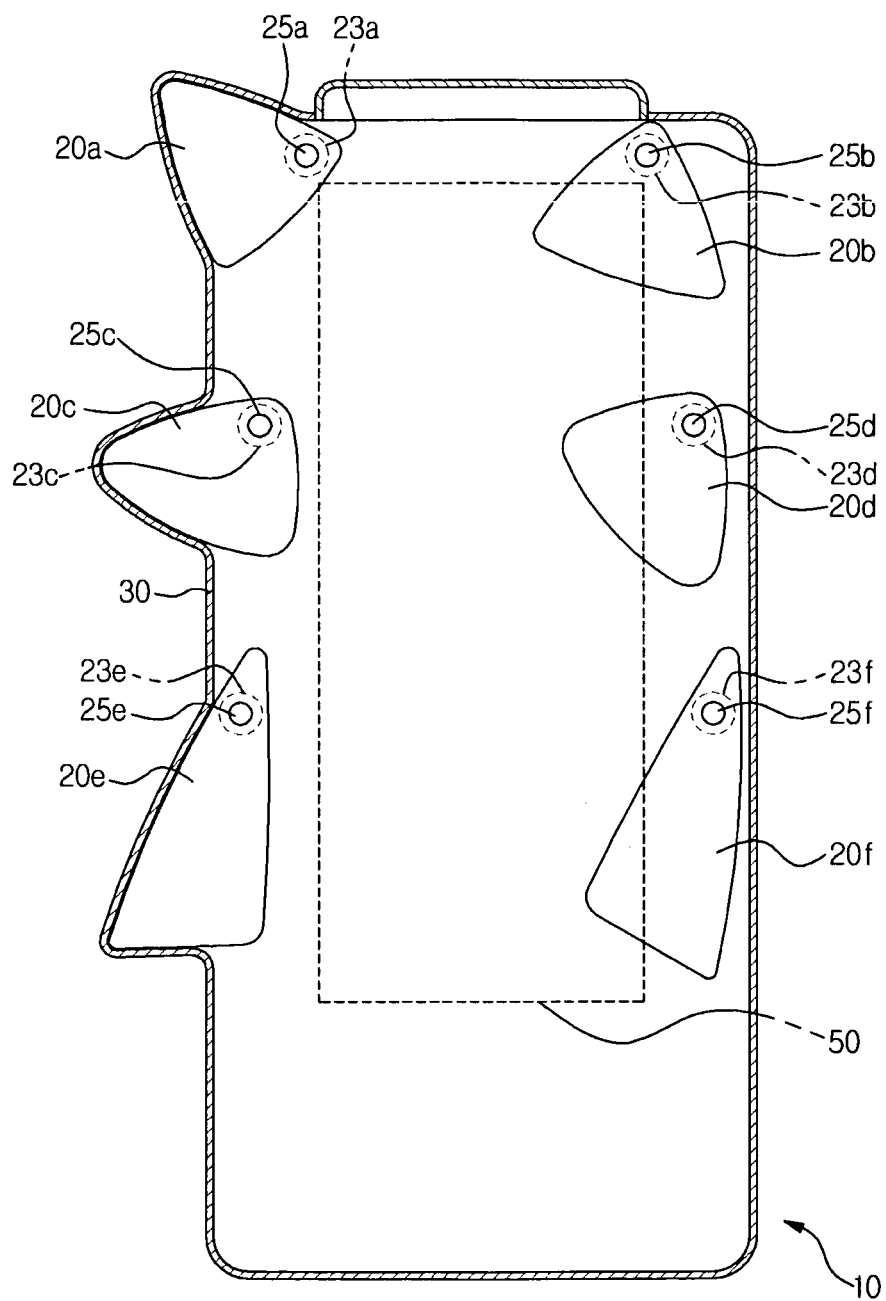
FIG. 2 is a detailed view illustrating the inside of a body part of the robot of FIG. 1.

FIG. 1 is a perspective view illustrating the external appearance of a robot in accordance with one exemplary embodiment, and FIG. 2 is a detailed view illustrating the inside of a body part of the robot of FIG. 1.

As shown in FIGS. 1 and 2, a robot 1 in accordance with one exemplary embodiment includes a body part 10 to receive cam members 20a, 20b, 20c, 20d, 20e, and 20f, and a support part 80 formed under the body part 10 to support the body part 10.

The body part 10 generally has a rectangular shape, as shown in FIG. 2. The cam members 20a, 20b, 20c, 20d, 20e, and 20f are installed at both sides of the inside of the body part 10, and an outer cover member 30 surrounding the cam members 20a, 20b, 20c, 20d, 20e, and 20f is installed at both sides of the outside of the body part 10. Further, a display device 50 to display data is installed on the front surface of the body part 10. A camera 12 to photograph an image, a microphone 14 to recognize a sound, and a speaker 16 to generate a sound are installed at the upper portion of the body part 10.

The cam members 20a, 20b, 20c, 20d, 20e, and 20f are installed at both sides of the inside of the body part 10. A first cam member 20a, a third cam member 20c, and a fifth cam member 20e are installed at the left side of the body part 10 in the vertical direction, and a second cam member 20b, a fourth cam member 20d, and a sixth cam member 20f are installed at the right side of the body part in the vertical direction symmetrically with the first, third, and fifth cam members 20a, 20c, and 20e. The arrangement of the cam members 20a, 20b, 20c, 20d, 20e, and 20f at both sides of the body part 10 in the vertical direction serves to easily make a gesture. That is, this arrangement facilitates the formation of a gesture corresponding to a motion of an image 105 displayed on the display device 50, which will be described later. The image 105 displayed on the display device 50 is the image of a human, and the arm motion of the human may be made by a gesture of the robot.

The respective cam members 20a, 20b, 20c, 20d, 20e, and 20f have a triangular shape with rounded corners. Further, the cam members 20e and 20f installed at the lower portion of the body part 10 are longer than the other cam members 20a, 20b, 20c, and 20d. The triangular shape with round corners of the cam members 20a, 20b, 20c, 20d, 20e, and 20f serves to easily make a gesture having a curved shape. When the cam members 20a, 20b, 20c, 20d, 20e, and 20f have a triangular shape, a motion of raising or lowering arms is easily carried out, and when the corners of the cam members 20a, 20b, 20c, 20d, 20e, and 20f are rounded, a gesture is made having a curved shape and gives a smooth impression.

Further, the cam members 20a, 20b, 20c, 20d, 20e, and 20f are respectively connected to the body part 10 by cam rotary shafts 25a, 25b, 25c, 25d, 25e, and 25f, and the cam rotary shafts 25a, 25b, 25c, 25d, 25e, and 25f are respectively connected to motors 23a, 23b, 23c, 23d, 23e, and 23f and rotate the cam members 20a, 20b, 20c, 20d, 20e, and 20f. The rotation of the cam members 20a, 20b, 20c, 20d, 20e, and 20f makes a gesture when seen from the outside.

The outer cover member 30 forms the outer surfaces of both sides of the body part 10 and surrounds the cam members 20a, 20b, 20c, 20d, 20e, and 20f installed in the body part 10. The outer cover member 30, which is made of a flexible and elastic member, closely adheres to the cam members 20a, 20b, 20c, 20d, 20e, and 20f, and thus the shape of the outer cover member 30 varies, when the cam members 20a, 20b, 20c, 20d, 20e, and 20f move. Since the corners of the cam members 20a, 20b, 20c, 20d, 20e, and 20f are rounded, the shape of the outer cover member 30 varies according to the motion of the cam members 20a, 20b, 20c, 20d, 20e, and 20f, and thus is made in a smooth curved shape.

The display device 50 is formed on the front surface of the body part 10, and displays various data. The image 105 is displayed on the display device 50. The image 105 may be the image of a human or an anthropomorphic animal. Data regarding the arm motion of the human or the animal is transmitted to a control unit (not shown), and the control unit transmits signals to the motors 23a, 23b, 23c, 23e, 23d, and 23f connected to the cam rotary shafts 25a, 25b, 25c, 25d, 25e, and 25f, and thus rotates the cam members 20a, 20b, 20c, 20d, 20e, and 20f corresponding to the arm motion.

The support part 80 is extended from the lower end of the body part 10, and serves to support and move the body part 10. Moving wheels 82 and driving devices (not shown) to drive the moving wheels 82 are installed on the lower surface of the support part 80, and thus move the robot 10 according to a signal of the control unit.

Hereinafter, an operation of making a gesture of the robot in accordance with one exemplary embodiment of the present invention will be described in detail.

Figure 3A:
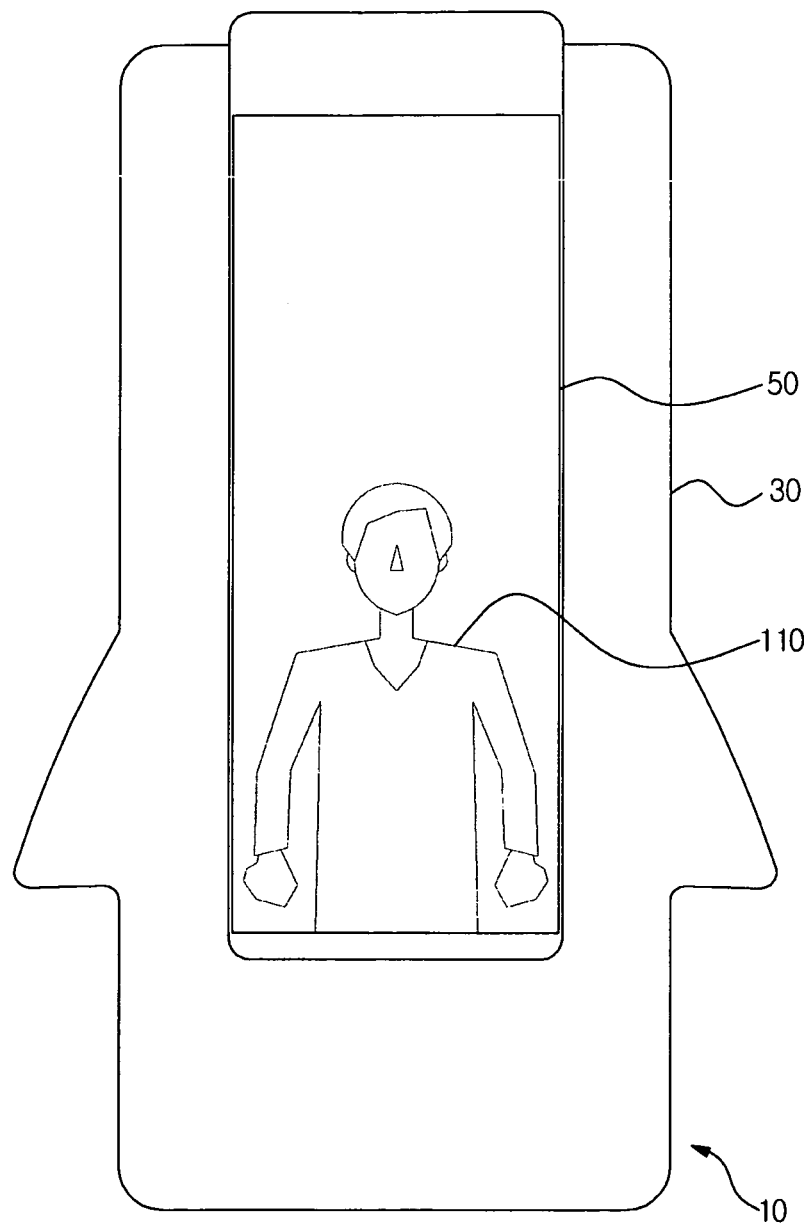
FIG. 3A is a front view of the body part in accordance with the embodiment, when both arms of an image displayed on a display device are lowered.
Figure 3B:
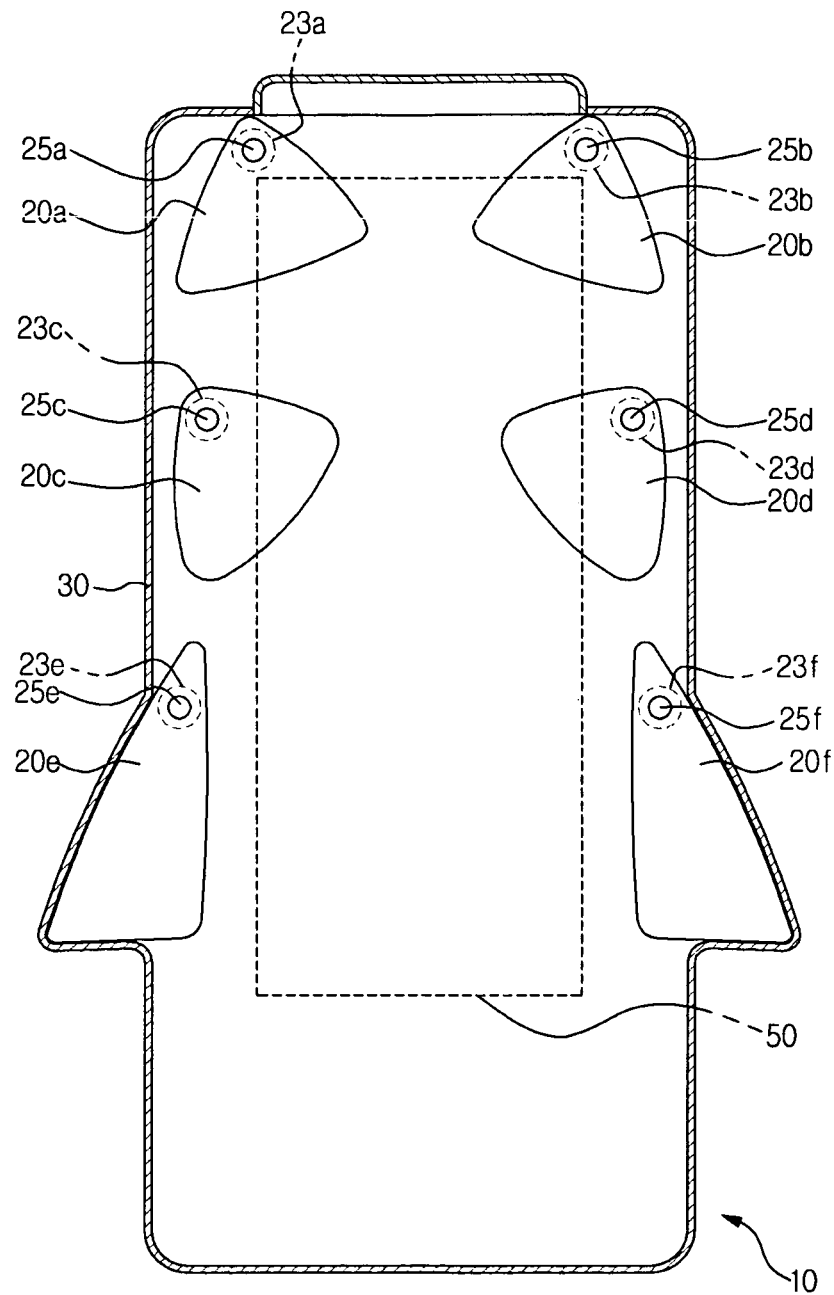
FIG. 3B is a detailed view illustrating the inside of the body part in the motion of FIG. 3A.
Figure 4A:
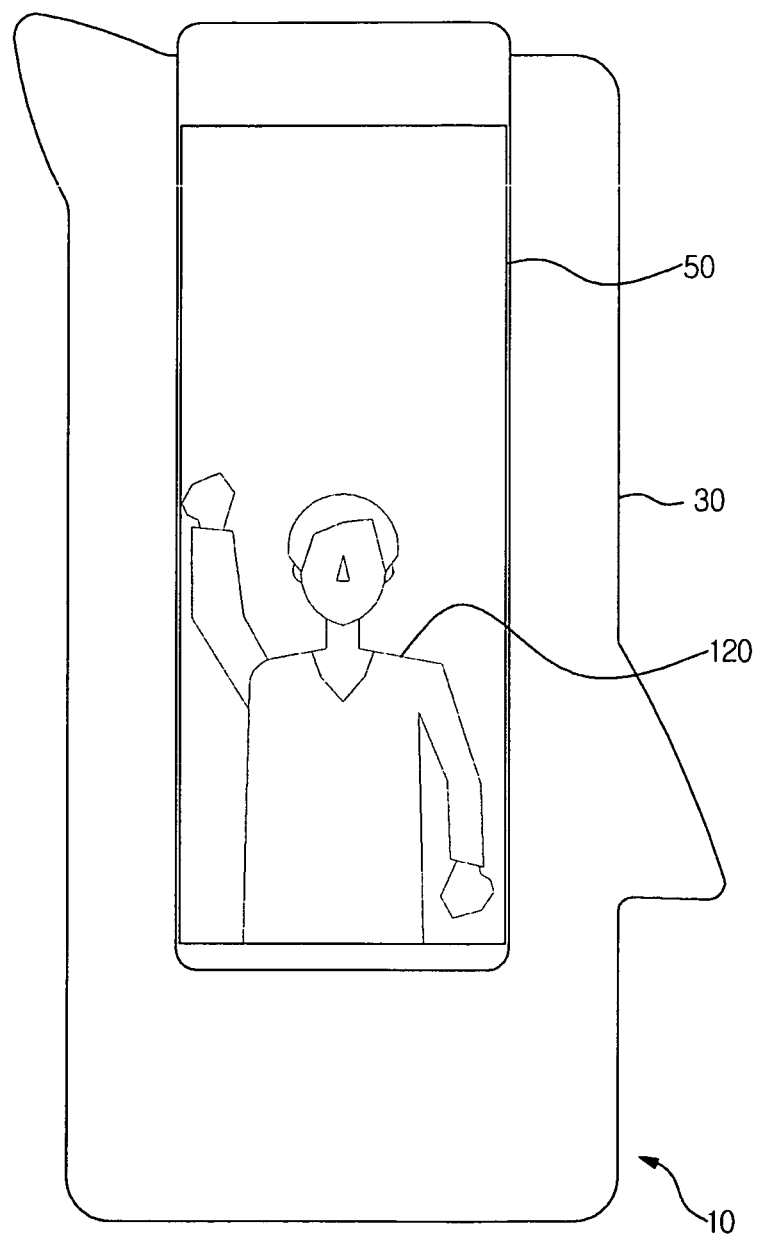
FIG. 4A is a front view of the body part in accordance with the embodiment, when one arm of an image displayed on the display device is raised and the other arm of the image is lowered.

FIG. 3A is a front view of the body part 10, when both arms of an image 110 displayed on the display device 50 are lowered, and FIG. 3B is a detailed view illustrating the inside of the body part 10 in the motion of FIG. 3A. FIG. 4A is a front view of the body part 10, when one arm of an image 120 displayed on the display device 50 is raised and the other arm of the image 120 is lowered, and FIG. 4B is a detailed view illustrating the inside of the body part 10 in the motion of FIG. 4A.

As shown in FIGS. 3A and 3B, when both arms of the image 110 of a human displayed on the display device 50 are lowered, a corresponding image signal is transmitted to the control unit (not shown), and the control unit respectively transmits driving signals to the motors 23a, 23b, 23c, 23d, 23e, and 23f connected to the cam rotary shafts 25a, 25b, 25c, 25d, 25e, and 25f so that the respective cam members 20a, 20b, 20c, 20d, 20e, and 20f are rotated. That is, the fifth cam member 20e and the sixth cam member 20f are rotated to the outside of the body part 10, and the first cam member 20a, the second cam member 20b, the third cam member 20c, and the fourth cam member 20d are rotated to the inside of the body part 10, so that a motion of lowering both arms of the human when seen from the outside is achieved. Thereby, a gesture of the robot 1, in which both arms are lowered, is achieved.

Figure 4B:
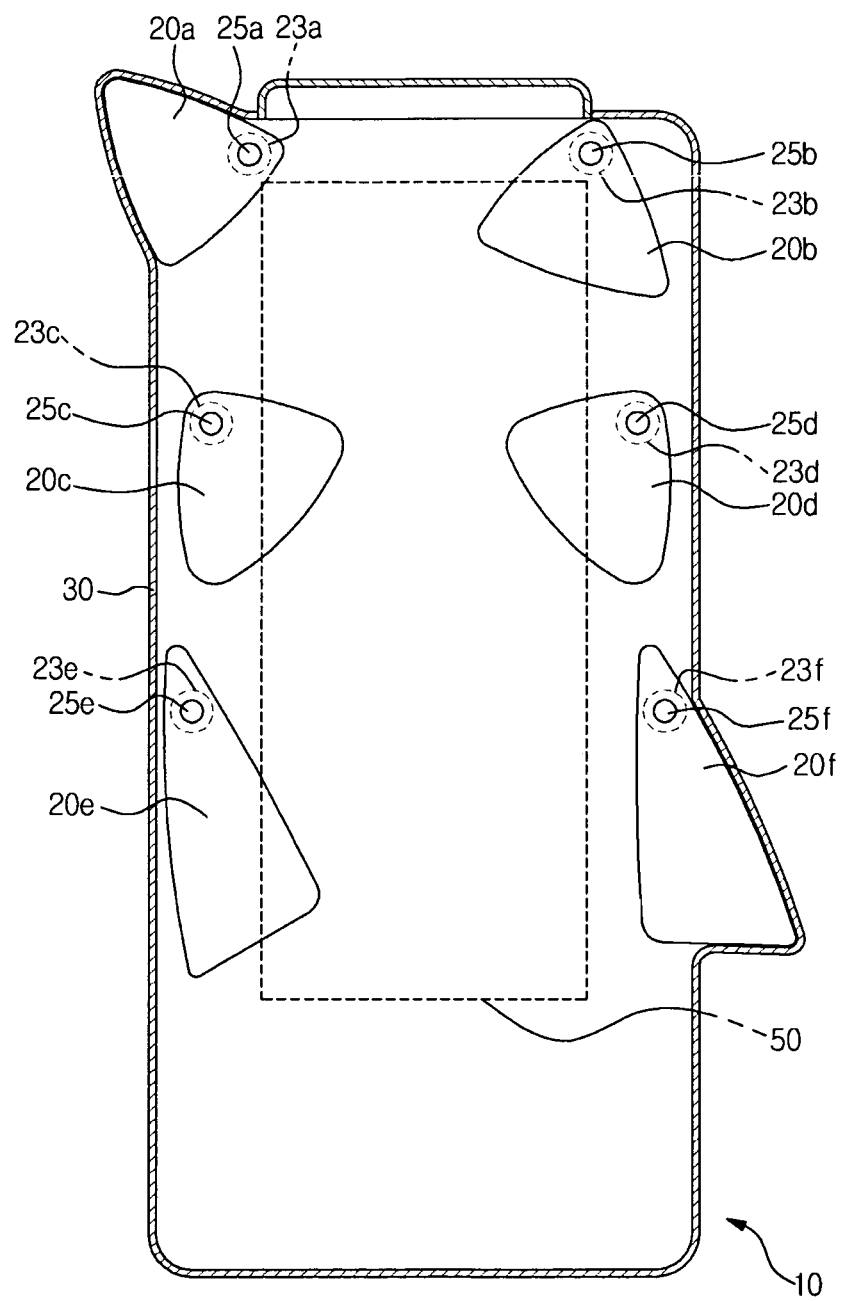
FIG. 4B is a detailed view illustrating the inside of the body part of the motion of FIG. 4A.

As shown in FIGS. 4A and 4B, when the right arm of the image 120 of a human displayed on the display device 50 is raised and the left arm of the image 120 is lowered, a corresponding image signal is transmitted to the control unit (not shown), and the control unit respectively transmits driving signals to the motors 23a, 23b, 23c, 23d, 23e, and 23f connected to the cam rotary shafts 25a, 25b, 25c, 25d, 25e, and 25f so that the respective cam members 20a, 20b, 20c, 20d, 20e, and 20f are rotated. That is, the first cam member 20a and the sixth cam member 20f are rotated to the outside of the body part 10, and the second cam member 20b, the third cam member 20c, the fourth cam member 20d, and the fifth cam member 20e are rotated to the inside of the body part 10, so that a motion of raising the right arm and lowering the left arm of the human when seen from the outside is achieved. Thereby, a gesture of the robot 1, in which the right arm is raised and the left arm is lowered, is achieved.

When the entire body part 10 corresponds to the bust of the human or the anthropomorphic animal, the image of the bust of the human is displayed on the display device 50, and when the arms of the image are moved, the cam members 20a, 20b, 20c, 20d, 20e, and 20f within the outer cover member 30 are rotated on the extension line of the arm motion according to the arm motion. By this method, various arm motions, i.e., a motion of raising both arms, a motion of lowering both arms, a motion of extending both arms in parallel, etc., may be achieved.

Figure 5:
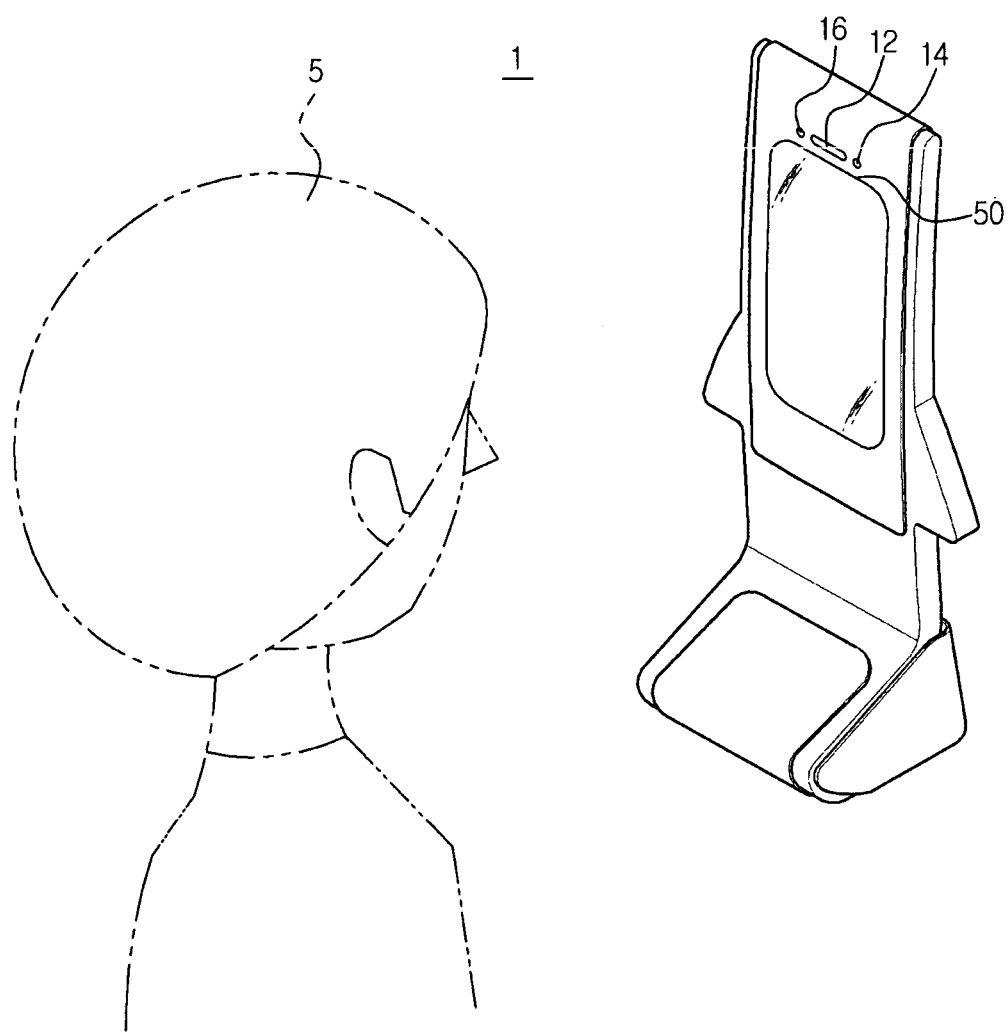
FIG. 5 is a view illustrating an example of the actual application of the robot in accordance with the embodiment.

FIG. 5 is a view illustrating an example of the actual application of the robot 1.

As shown in FIG. 5, the robot 1 may communicate with a human 5 through a gesture. The robot 1 may communicate with an image displayed on the display device 50.

The robot 1 captures an image of the human 5 through the camera 12, and recognizes a voice of the human 5 through the microphone 14. Further, the robot 1 generates various sounds through the speaker 16 while making a gesture. Here, an arm motion according to the movement of the image is achieved by the rotation of the cam members 20a, 20b, 20c, 20d, 20e, and 20f surrounded by the outer cover member 30, and the human 5 communicating with the robot 1 not only communicates with the robot 1 but also obtains a cute and intimate feeling due to the smooth motion caused by the movement of the outer cover member 30.

Hereinafter, another exemplary embodiment will be described in detail with reference to the annexed drawings. A detailed description of some parts in this embodiment, which are substantially the same as those in the former exemplary embodiment, will be omitted.

Figure 6:
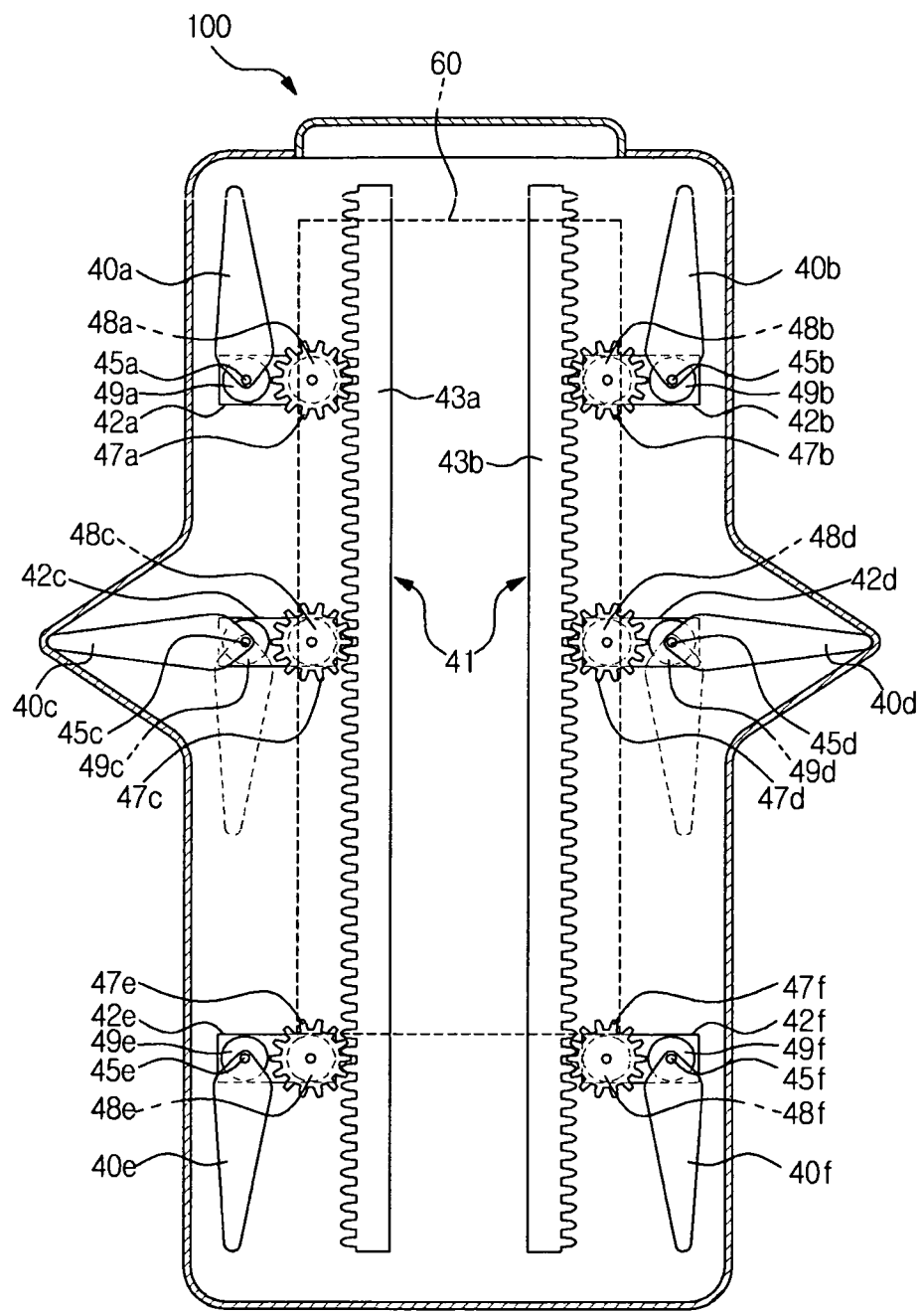
FIG. 6 is a detailed view illustrating the inside of a body part of a robot in accordance with another exemplary embodiment.

FIG. 6 is a detailed view illustrating the inside of a body part 100 of a robot in accordance with another exemplary embodiment.

As shown in FIG. 6, the robot in accordance with this embodiment further includes a linear moving device 41, which linearly moves cam members 40a, 40b, 40c, 40d, 40e, and 40f in the vertical direction.

The linear moving device 41 is respectively installed at both sides of the body part 10, and includes rack gears 43a and 43b to move the cam members 40a, 40b, 40c, 40d, 40e, and 40f in the vertical direction, pinion gears 47a, 47b, 47c, 47d, 47e, and 47f engaged with the rack gears 43a and 43b and moving in the vertical direction, pinion motors 48a, 48b, 48c, 48d, 48e, and 48f to drive the pinion gears 47a, 47b, 47c, 47d, 47e, and 47f such that the pinion gears 47a, 47b, 47c, 47d, 47e, and 47f move on the rack gears 43a and 43b, cam motors 49a, 49b, 49c, 49d, 49e, and 49f to rotate the cam members 40a, 40b, 40c, 40d, 40e, and 40f, and brackets 42a, 42b, 42c, 42d, 42e, and 42f to support the pinion motors 48a, 48b, 48c, 48d, 48e, and 48f and the cam motors 49a, 49b, 49c, 49d, 49e, and 49f such that the pinion gears 47a, 47b, 47c, 47d, 47e, and 47f and the cam members 40a, 40b, 40c, 40d, 40e, and 40f move together. The pinion gears 47a, 47b, 47c, 47d, 47e, and 47f located on the rack gears 43a and 43b are respectively moved in the vertical direction by the pinion motors 48a, 48b, 48c, 48d, 48e, and 48f, and the cam members 40a, 40b, 40c, 40d, 40e, and 40f are respectively rotated on cam rotary shafts 45a, 45b, 45c, 45d, 45e, and 45f by the cam motors 49a, 49b, 49c, 49d, 49e, and 49f. When the pinion gears 47a, 47b, 47c, 47d, 47e, and 47f move in the vertical direction by the driving of the pinion motors 48a, 48b, 48c, 48d, 48e, and 48f, the cam members 40a, 40b, 40c, 40d, 40e, and 40f restricted by the brackets 42a, 42b, 42c, 42d, 42e, and 42f reciprocate in the vertical direction on the rack gear 43a and 43b together with the pinion gears 47a, 47b, 47c, 47d, 47e, and 47f.

Hereinafter, an operation of making a gesture of the robot in accordance with another exemplary embodiment will be described in detail.

The basic moving principle of the robot in this embodiment is the same as that in the former exemplary embodiment. That is, a gesture may be made by rotating the cam members 40a, 40b, 40c, 40d, 40e, and 40f corresponding to the motion of an image displayed on a display device 60. However, since the robot in this embodiment further includes the linear moving device 41, the cam members 40a, 40b, 40c, 40d, 40e, and 40f may move in the vertical direction according to the vertical movement of the pinion gears 47a, 47b, 47c, 47d, 47e, and 47f. Therefore, the formation of a gesture according to the movement of the image displayed on the display device 60 may be more delicate, and a wider variety of gestures may be made.

Although the above embodiments illustrate that three cam members are installed at each of both sides of the body part 10 or 100, the number of the cam members may be variously modified.

Further, although the above embodiments exemplarily illustrate that the image displayed on the display device is the image of a human or an anthropomorphic animal, various images may be displayed on the display device and the number of humans or anthropomorphic animals made in the image may be plural.

As is apparent from the above description, the robot in accordance with one embodiment employs the cam members and the outer cover member, and thus is capable of making a gesture in a smooth curved shape. Therefore, the gesture provides natural and smooth impressions, and thus the robot may effectively express feelings.

Although a few embodiments have been shown and described, it would be appreciated by those skilled in the art that changes may be made in these embodiments without departing from the principles and spirit of the embodiments, the scope of which is defined in the claims and their equivalents.

What is claimed is:

1. A robot comprising:
   at least one cam member installed inside of a body part;
   a linear moving device to move the at least one cam member; and
   an outer cover member adhered to the at least one cam member, wherein a shape of the outer cover member is varied according to the movement of the at least one cam member,
   wherein the linear moving device includes:
   a cam rotary shaft configured to rotatably move the at least one cam member; and
   a rack gear and a pinion gear engaged with the rack gear, wherein the pinion gear is configured to move on the rack gear in a vertical direction so as to linearly move the at least one cam member in the vertical direction.

2. The robot according to claim 1, further comprising a display device to display data.

3. The robot according to claim 1, wherein the at least one cam member has a triangular shape with rounded corners.

4. The robot according to claim 1, further comprising a plurality of the cam members; and
   the body part to receive the cam members, wherein the cam members are symmetrically arranged at both sides of an inside of the body part.

5. The robot according to claim 4, wherein three of the cam members are arranged in the vertical direction at each of both sides of the inside of the body part.

6. The robot according to claim 1, wherein the outer cover member is made of a flexible and elastic material.

7. The robot according to claim 1, wherein the shape of the outer cover member is varied into a curved shape.

8. The robot according to claim 1, wherein the at least one cam member is rotated on the cam rotary shaft.

9. The robot according to claim 1, wherein the shape of the at least one cam member remains the same when the at least one cam member is moved.

10. A robot comprising:
at least one cam member installed inside of a body part;
a linear moving device to linearly move in a vertical direction each of the at least one cam member;
an outer cover member adhered to the at least one cam member, wherein a shape of the outer cover member is varied according to the movement of the at least one cam member; and
a display device to display data,
a control unit configured to move the at least one cam member in a manner corresponding to a gesture of an image displayed on the display device.

11. A robot comprising:
at least one cam member; and
an outer cover member adhered to the at least one cam member, wherein a shape of the outer cover member is varied according to the movement of the at least one cam member,
further comprising a linear moving device to linearly move the at least one cam member,
wherein the linear moving device includes a rack gear to move the at least one cam member in a vertical direction, a pinion gear engaged with the rack gear and moving in the vertical direction, a pinion motor to drive the pinion gear, a cam motor to rotate the at least one cam member, and a bracket to support the pinion motor and the cam motor such that the pinion gear and the cam member move together.

12. A robot comprising:
at least one cam member installed inside of a body part;
a linear moving device to move the at least one cam member; and
an outer cover member surrounding the at least one cam member, wherein a shape of the outer cover member is varied according to movement of the at least one cam member, to thereby make a gesture,
wherein the linear moving device includes:
a cam rotary shaft configured to rotatably move the at least one cam member; and
a rack gear and a pinion gear engaged with the rack gear, wherein the pinion gear is configured to move on the rack gear in a vertical direction so as to linearly move the at least one cam member in the vertical direction.

13. The robot according to claim 12, wherein the gesture represents human arm motions.

14. The robot according to claim 13, wherein the arm motions include a motion of raising both arms, a motion of lowering both arms, and a motion of extending both arms in parallel.

15. The robot according to claim 12, further comprising a display device to display data.

16. The robot according to claim 15, further comprising:
a control unit configured to make the gesture corresponding to the movement of an image displayed on the display device.

17. A robot comprising:
a body part;
a plurality of cam members symmetrically arranged at both sides of an inside of the body part;
an outer cover member adhered to at least one of the cam members; and
a linear moving device to linearly move in a vertical direction each of the at least one cam members, wherein a shape of the outer cover member is varied, according to the movement of the at least one cam member,
wherein the linear moving device includes:
a cam rotary shaft configured to rotatably move the at least one cam member; and
a rack gear and a pinion gear engaged with the rack gear, wherein the pinion gear is configured to move on the rack gear in a vertical direction so as to linearly move the at least one cam member in the vertical direction.

18. A robot comprising:
a body part;
a plurality of cam members symmetrically arranged at both sides of an inside of the body part;
an outer cover member adhered to at least one cam members;
a linear moving device to linearly move in a vertical direction each of the at least one cam member, wherein a shape of the outer cover member is varied, according to the movement of the at least one cam member;
a display device to display data, and
a control unit configured to move the at least one of the cam members in a manner corresponding to a gesture of an image displayed on the display device.

* * * * *